(12) United States Patent
Hicks et al.

(10) Patent No.: US 8,483,029 B2
(45) Date of Patent: *Jul. 9, 2013

(54) CONTEXT-BASED ERROR INDICATION METHODS AND APPARATUS

(75) Inventors: Kourtny Minh Hicks, Sunnyvale, CA (US); William Bull, Mountain View, CA (US); Benjamin Andrew Rottler, Burlingame, CA (US); Eric James Hope, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,658

(22) Filed: Jul. 9, 2012

(65) Prior Publication Data

US 2012/0278667 A1 Nov. 1, 2012

Related U.S. Application Data

(63) Continuation of application No. 12/156,620, filed on Jun. 2, 2008, now Pat. No. 8,233,366.

(51) Int. Cl.
*G11B 20/18* (2006.01)
(52) U.S. Cl.
USPC ........................................... 369/53.42
(58) Field of Classification Search
USPC ........ 369/53.42, 53.15, 53.17, 53.35; 726/27; 714/11, 13, 4.11, 798, 54, 6, 12, 42; 370/231, 370/236
See application file for complete search history.

(56) References Cited

U.S. PATENT DOCUMENTS

| | | | |
|---|---|---|---|
| 6,625,750 B1 | 9/2003 | Duso et al. | |
| 7,969,844 B2 | 6/2011 | Watanabe et al. | |
| 8,095,858 B2 | 1/2012 | Peters | |
| 8,107,945 B2 | 1/2012 | Hoffner et al. | |
| 8,233,366 B2 * | 7/2012 | Hicks et al. | 369/53.42 |
| 2008/0043619 A1 | 2/2008 | Sammour et al. | |

* cited by examiner

*Primary Examiner* — Ali Neyzari
(74) *Attorney, Agent, or Firm* — Kilpatrick Townsend & Stockton LLP

(57) ABSTRACT

A media player may occasionally be unable to play or continue to play a particular item of media. When that occurs, the media player outputs an error indication that is related to the type of media that the problem media item is representative of. For example, if the problem item is a movie, then the media player may display an error indication having the appearance of broken movie film. If the problem media item is music, then the media player may display an error indication having the appearance of a broken compact disc ("CD"). Thus whatever the type of media that is not playing, the media player outputs an error indication that is appropriate for that type of media. The error indications output by the player are therefore context-based or media-appropriate.

40 Claims, 10 Drawing Sheets

US 8,483,029 B2

CONTEXT-BASED ERROR INDICATION METHODS AND APPARATUS

CROSS REFERENCE TO RELATED APPLICATION

This application is a continuation of U.S. patent application Ser. No. 12/156,620, filed Jun. 2, 2008 (now allowed), which is hereby incorporated by reference herein in its entirety.

BACKGROUND OF THE INVENTION

This invention relates to how an electronic device (such as a multi-media device) interacts with a user of the device. More particularly, the invention relates to how the device indicates to the user that the device is unable to proceed with a function the user has requested.

Several types of electronic devices can store and then "play" for a user various types of media. For example, the media may be video or video-like media such as a movie or music video. Such video media may be visual-only (like a silent movie) or both visual and audio (like most contemporary movies that include a sound track). Another example of media is audio-only media, like music unaccompanied by any visual images. Whatever the form of the media, an electronic device playing the media for a user preferably reproduces for the user all aspects of the content of that media. For example, if the media includes visual content, the electronic device playing that media typically displays that content on a display screen so the user can see it as intended by the originator of the media. Alternatively or in addition, if the media includes audio content, then the electronic device playing that media typically produces an audible output of that content (e.g., via speakers, ear phones, or the like) so that the user can hear the audio content as intended by the originator of the media. Another term that is sometimes used for playing media is "reproducing" media. All of these terms mean delivering the media to one or more senses (e.g., the eyes and/or ears) of the user as the originator of the media intended that the user would receive and experience the media.

Examples of electronic devices that can play one or more types of media are some personal computers, some hand-held media players (e.g., the iPOD® media player available from Apple Inc. of Cupertino, Calif.), some cellular telephones ("cell phones") or cell-phone-like devices (e.g., the iPHONE® cellular telephone available from Apple Inc.), and the like. Such devices may receive the media that they play in any of a number of different ways. For example, the device may play the media more or less directly from a hard or relatively hard source of the media such as a pre-recorded CD or DVD. Alternatively, the device may first load the media from such a hard or relatively hard source into a memory in the device, and thereafter play the media from that memory. As another example, the device may receive the media from another device or a remote source. This may be done via any of several different types of links such as a cable connection or a wireless connection (e.g., a cellular telephone connection, a WIFI connection, a Bluetooth connection, or the like). Such downloading of media from another device or remote source typically involves storing the media in memory of the device receiving the download so that the device can later play the media from that memory.

For convenience in the further discussion herein, all devices of the above-mentioned types that can play or reproduce media for a user may sometimes be referred to as media players or the like. A media player that can play or reproduce media having multiple forms of content (e.g., both audio and video content) or more than one kind of media (e.g., media that is audio only and media that is both audio and video) may sometimes be referred to as a multi-media player or the like. As used herein, multi-media players are included within the term media players. In other words, the more general or generic term is media player. Multi-media players are a subset of media players.

Occasionally a media player will be unable to proceed with playing media requested by the user. This may occur for any of several reasons such as a defect or error in the data for the media. When that occurs, the media player typically provides little or no information to the user about the player's inability to proceed.

SUMMARY OF THE INVENTION

In accordance with certain possible aspects of the invention, a method of operating a media player may include allowing a user of the player to select an item of media of a particular kind for playing by the player. The player then at least attempts to play the selected item. Any failure of the player to completely play the item is detected. And when such a failure is detected, the player outputs an error indication that is indicative of that particular kind of media. The error indication may include image information, or audio information, or both. The image information may be still or moving. The image information may include an image of broken media of the kind that the item is. The audio information may include a sound associated with broken media of the kind that the item is.

In accordance with certain other possible aspects of the invention, a method of operating a media player that is adapted for playing media of any of a plurality of different kinds may include storing a plurality of error indications in the player, each error indication being evocative of a breakdown in playing a respective one of the plurality of kinds of media. The user of the player is allowed to select any one of the plurality of kinds of media, and any one of a plurality of items of media of the selected kind. The player plays (or at least attempts to play) the selected item. The player detects any failure of its ability to completely play the selected item. When such a failure is detected, the player selects from the plurality of error indications the one of those indications that is evocative of a breakdown in playing media of the kind that the selected item is. The player then outputs the selected error indication.

In accordance with still other possible aspects of the invention, a method of operating a media player may include allowing a user of the player to connect the player to an external source of data for a plurality of error indications. The user may then operate the player to select any one of the plurality of error indications. The selected error indication is downloaded from the external source to the player. The player outputs the selected error indication when the player fails to operate properly. The error indications may be evocative of a breakdown in playing media. In that case, the player outputs the selected error indication when the player fails to play an item of media.

The media player may be adapted for playing media of any of a plurality of different kinds. For each of those kinds there may be a respective subplurality of the error indications, each error indication in a subplurality being evocative of a breakdown in playing media of the kind that is associated with that subplurality. The user may operate the player to select any one of the error indications from each of the subpluralities. The selected error indications are downloaded from the external source to the player. Subsequently, when the player is unable to completely play an item of media of a particular kind, the player outputs the downloaded error indication that is evocative of a breakdown in playing media of that kind.

Further features of the invention, its nature and various advantages, will be more apparent from the accompanying drawings and the following detailed description.

DETAILED DESCRIPTION

Figure 1:
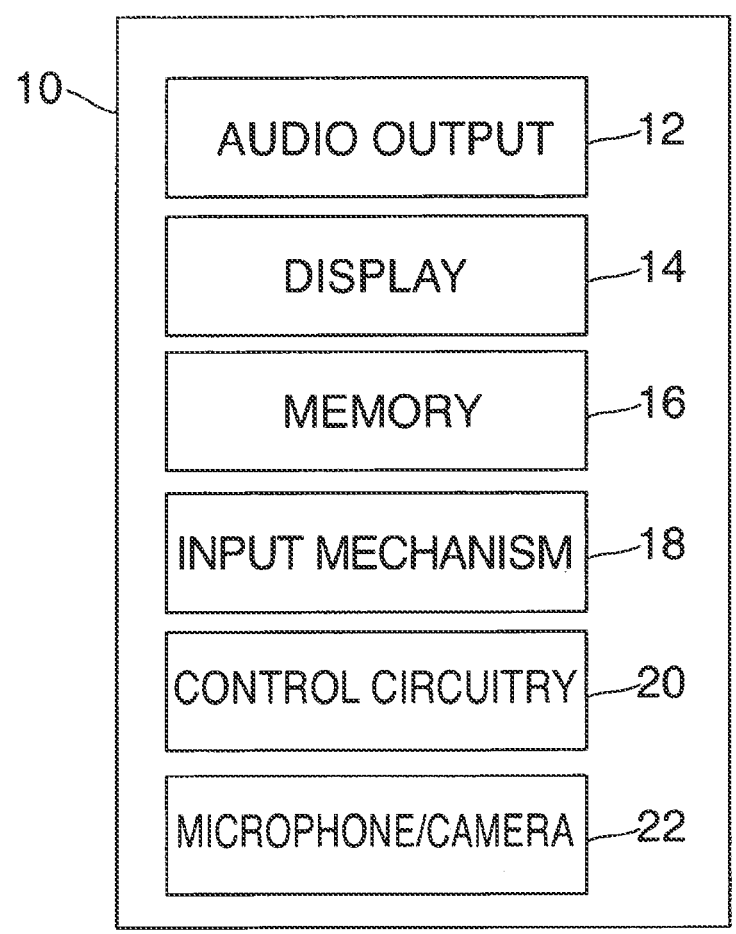
FIG. 1 is a simplified block diagram of an illustrative embodiment of a media player that may be operated in accordance with the present invention.

An illustrative electronic media player 10 that can be operated in accordance with the invention is shown in simplified, block diagram, form in FIG. 1. Media player 10 includes audio output 12 (e.g., one or more speakers and/or one or more ear phones (or at least one or more receptacles for ear phone jacks)). Audio output 12 may be used for reproducing (i.e., rendering audible to the user of media player 10) audio content of media being played by player 10, but it may also be used for giving the user other information via sounds audible to the user. More will be said about this additional possible use of audio output 12 later in this specification. Media player 10 further includes visible display 14 (e.g., a display suitable for reproducing (i.e., rendering visible to the user of player 10) visual (e.g., video) content of media being played by the player). Display 14 may also be used for giving the user of player 10 other information via graphics and/or text visible to the user. More will also be said about this possible additional use of display 14 later in this specification.

Another typical component of media player 10 is memory 16. This memory may be used to store media that can be played by player 10. It may also store other information, and it may also be used to store software that controls certain aspects of the operation of player 10.

Still another typical component of media player 10 is input mechanism 18, by which the user may control certain aspects of the operation of media player 10 and/or by which player 10 may receive information (e.g., media, etc.) from external sources. Mechanism 18 may take any of several forms, and may include, for example, any one or more of a keypad, a touch screen, a track ball, individual function control buttons, and any other means by which the user may give instructions to player 10. As noted above, mechanism 18 may also include one or more types of inputs for information coming from other sources. Thus mechanism 18 may also include one or more of a cable connection, a WIFI connection or interface, a Bluetooth connection or interface, a cellular telephone connection or interface, or the like.

Other typical components of media player 10 include control circuitry 20 and microphone and/or camera 22. Control circuitry 20 typically controls operation of player 10, subject in some respects to instructions input by the user and/or other sources via input mechanism 18, and possibly also subject in some respects to control software executed from memory 16. Microphone and/or camera 22 can be used by the user of device 10 to enter sound information and/or image information.

Figure 2:
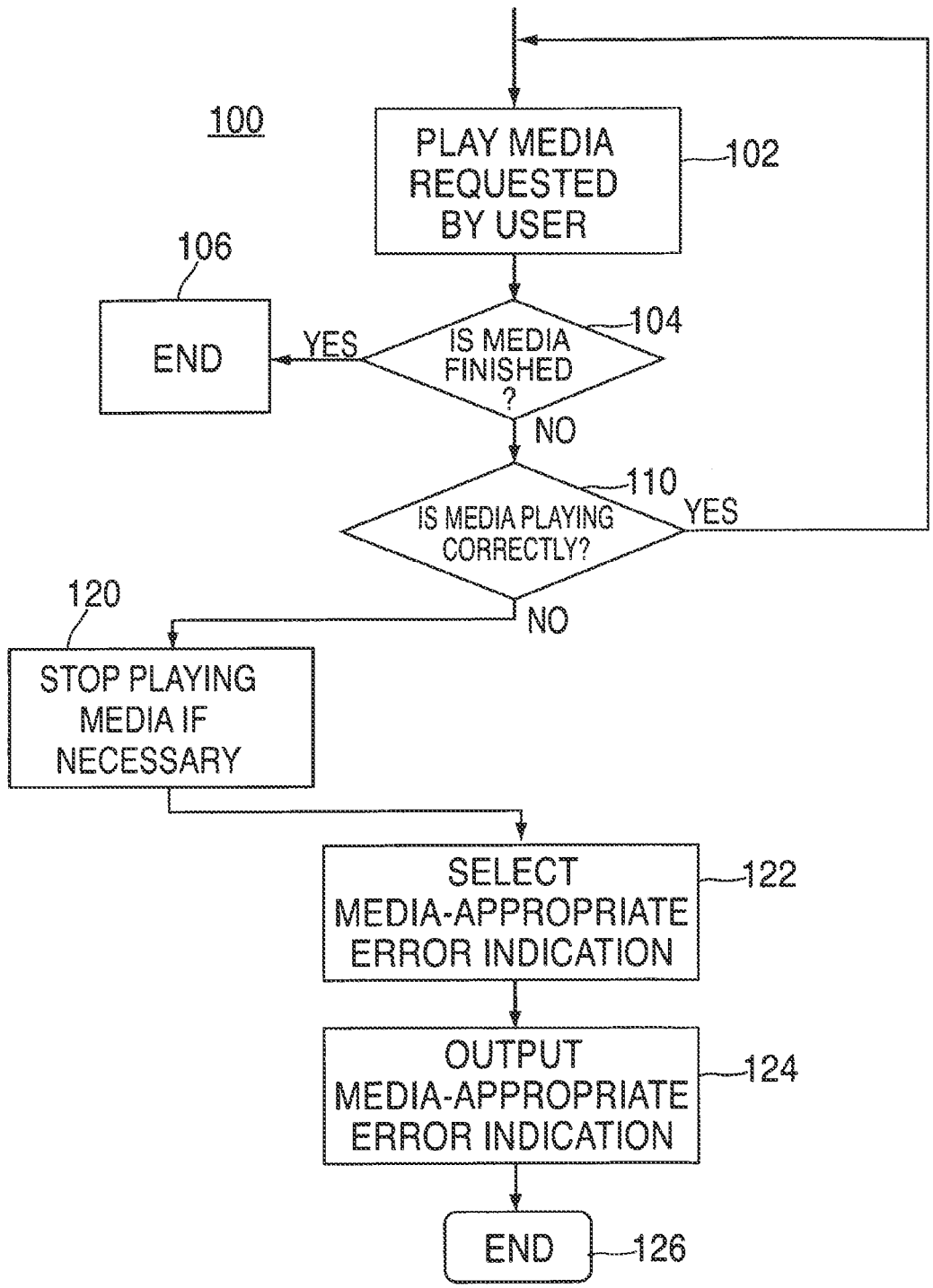
FIG. 2 is a simplified flow chart for an illustrative embodiment of certain possible aspects of the invention.

An illustrative embodiment 100 of steps that media player 10 may perform in connection with playing media in accordance with the present invention is shown in FIG. 2. At the head of flow 100 is step 102, which calls for player 10 to play some media requested by the user of player 10. For example, the user may request player 10 to play a particular piece of music or to play a particular movie, and step 102 indicates that player 10 responds by playing the requested media.

Step 104 is performed periodically (e.g., at many, successive, very closely spaced times) to determine whether or not play of the requested media has concluded. If so, control passes from step 104 to step 106, where the flow ends. If step 104 does not find that play of the requested media has finished then control passes from step 104 to step 110.

After each transfer of control from step 104 to step 110, step 110 determines whether or not the media is playing correctly. For example, step 110 may monitor the flow of information for the media from memory 16 through other circuitry (e.g., 20) of player 10 to display 14 and/or audio output 12 to make sure that such information is flowing properly (e.g., at a normal rate, with an expected rate of progress through the information, without improper repetition of information, without undue numbers of data errors in the information, etc.). If step 110 determines that the media is playing correctly, then control passes from step 110 back to step 102 to allow play of the media to continue. If the media is playing correctly, control remains in loop 102, 104, 110, 102, . . . until the media finishes playing properly and the above-mentioned loop is exited at step 106. On the other hand, if at any time step 110 detects that the media is not playing correctly, then control passes from step 110 to step 120.

When control passes to step 120 (because step 110 has found that player 10 is not playing the media correctly), step 120 causes player 10 to stop attempting to play the media (if the player is still trying to play the media). Control then passes to step 122.

Step 122 causes player 10 to select a type of error indication that is appropriate for the type of media that the player was trying to play. For example, if the media that player 10 was attempting to play was a movie (motion picture), then step 122 may select (1) a graphic (still or moving) that resembles what one sometimes sees on a motion picture screen when the movie film passing through a motion picture projector breaks, and/or (2) an audio clip that resembles what one sometimes hears from the sound system of a motion picture projector when the film passing through the projector breaks. Assuming that step 122 has selected the above-mentioned graphic and audio error indications, then step 124 (which follows step 122) causes player 10 to display on display 14 the selected graphic (still or moving), and to audibly output via audio output 12 the selected audio clip (in synchronization with the graphic on display 14). This example is further illustrated by FIG. 3, which is described in the next paragraph.

Figure 3:
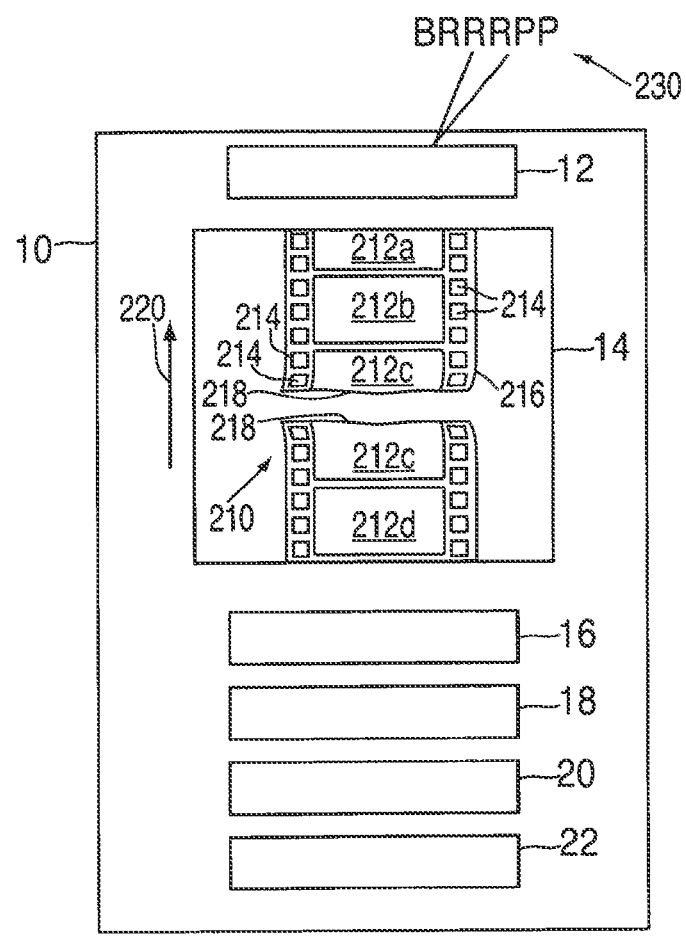
FIG. 3 is generally similar to FIG. 1 for an illustrative use of the apparatus in accordance with the invention.

FIG. 3 shows an example of how media player 10 may output a media-appropriate (or context-based) error indication when step 124 is performed. The context illustrated by FIG. 3 is the context mentioned in the preceding paragraph, namely, detection of a significant error while playing media that is a movie or that is at least movie-like. The error indication illustrated by FIG. 3 includes a graphic 210 that is displayed on display 14 and that is at least somewhat like a user might see on a motion picture screen when motion picture film going through a motion picture projector suddenly breaks. This graphic may be a still image of broken motion picture film, including a representation of the film itself 216, with a break 218 at one point along its length, and with other typical visual features or characteristics of motion picture film such as a succession of image or "frame" areas 212*a-d*, rows of sprocket holes 214 along both sides of the central image area, etc. Alternatively, the same image content may be provided in a moving graphic, e.g., an image that moves at a rate somewhat like the rate of film through a projector from the bottom to the top of display 14 as suggested by the arrow 220 in FIG. 3. At the same time, audio output 12 may emit sounds 230 from an audio clip, which sounds at least resemble sounds that may come from a motion picture projector sound system when traditional motion picture film that includes a sound track breaks in the projector. The letters BRRRPP are included in FIG. 3 to indicate what this audio output may sound like. (This sound can be somewhat like the sound made by a conventional phonograph needle being quickly swept transversely across a number of the grooves on a conventional phonograph record.) Again, FIG. 3 shows an example of context-based error indications that media player 10 may output to indicate to the user of the media player that the player is no longer able to proceed with playing media that is in the nature of a movie. These output indications 210 and 230 are context-based (or media-appropriate) because they resemble or at least evoke for the user the experience the user may associate with failure of this same type of media to play in other contexts (e.g., in a movie theater when the motion picture film going through the theater's motion picture projector breaks, resulting in an image like 210 on the theater's motion picture screen and a sound like 230 from the theater's sound system).

Figure 4:
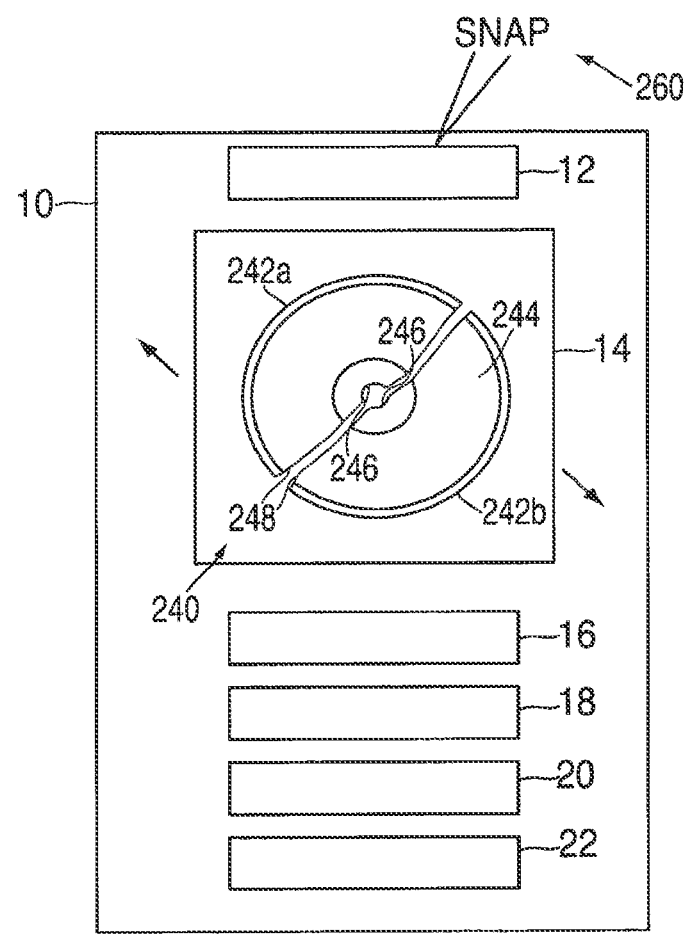
FIG. 4 is again generally similar to FIG. 1 for another illustrative use of the apparatus in accordance with the invention.

FIG. 4 shows another example of context-based error indications that media player 10 may output when another type of media fails to play correctly. Again, FIG. 4 is another example of what player 10 may output when step 124 is performed, but for a different type of media than for which the FIG. 3 error outputs would typically be used. The error indications shown in FIG. 4 may be appropriate for an error that prevents play of media that is audio and that the user may associate with coming from a CD (compact disc). Accordingly, the error indications shown in FIG. 4 include a graphic 240 on display 14 of a broken or breaking CD, and a sound 260 from audio output 12 that resembles the sound of a CD being broken (represented by the letters SNAP in FIG. 4). As shown in FIG. 4, graphic 240 may include features that are typical of a broken CD. These may include two CD halves or portions 242*a* and 242*b*, with a space having mating jagged edges 248 between them. Other typical features of a CD may be included in graphic 240, such as the typical central aperture 246 and the ring-shaped data and/or label area 244. Graphic 240 may be a still image, or it may be a moving image (e.g., showing portions 242*a* and 242*b* moving away from one another on display 14 as indicated by the arrows 250*a* and 250*b* in FIG. 4).

Figure 5:
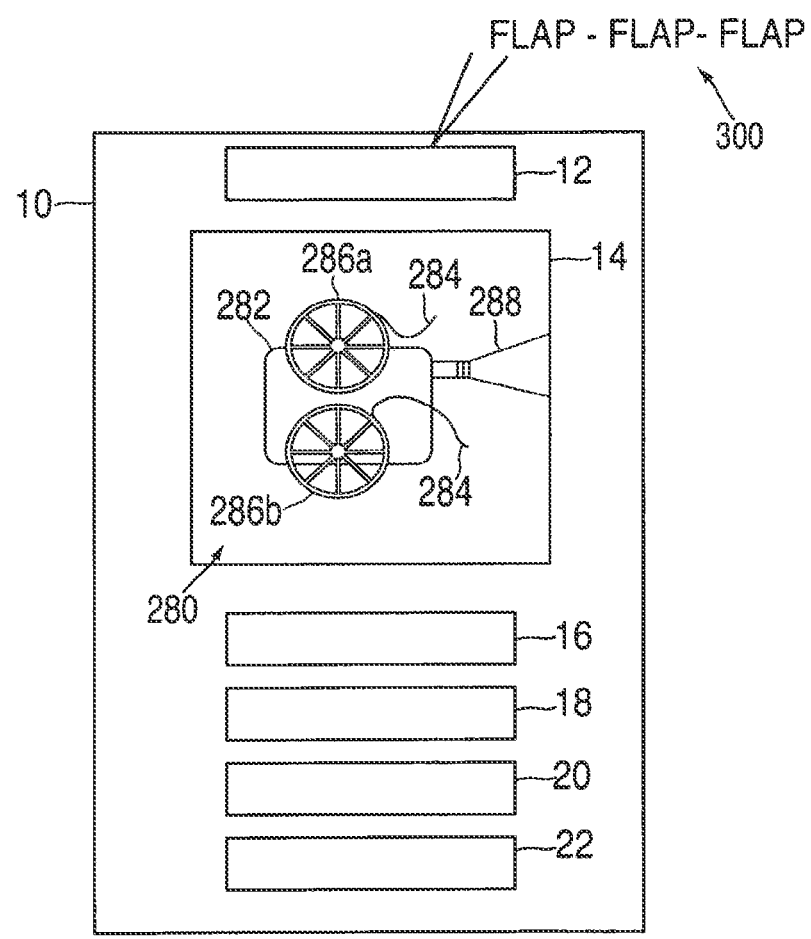
FIG. 5 is once again generally similar to FIG. 1 for yet another illustrative use of the apparatus in accordance with the invention.

FIG. 5 shows alternative output indications that media player 10 may provide (per step 124) when a failure occurs in playing media of the general kind for which what is shown in FIG. 3 might be used (i.e., media that is a movie or like a movie). In FIG. 5 the graphic image 280 on display 14 is that of a motion picture projector 282 in which the motion picture film 284 has broken and is flying around outside the normal path of film through the projector. The sound 300 output by audio output 12 can be similar to the sound that such broken, loose ends of film make as the reels of the projector continue to turn. In FIG. 5 this sound is indicated by the letters FLAP-FLAP-FLAP. Graphic 280 may include other features of an iconic motion picture projector such as film reels 286*a* and 286*b* (which can be shown as revolving, if desired), and light 288 emanating from a lens portion of the projector.

Figure 6:
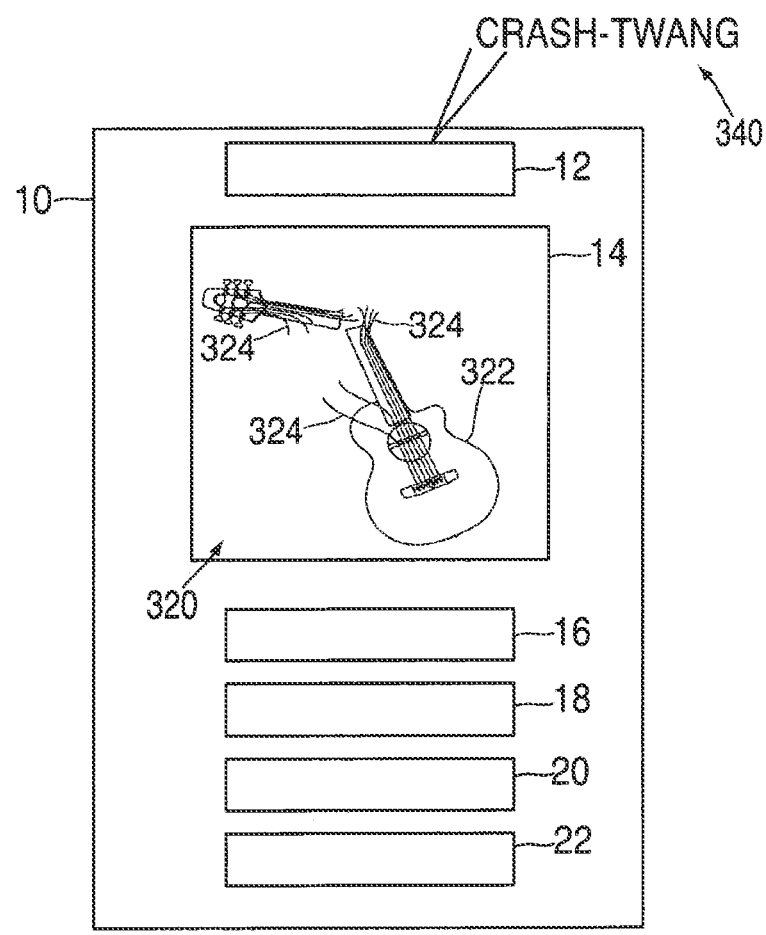
FIG. 6 is yet again generally similar to FIG. 1 for still another illustrative use of the apparatus in accordance with the invention.

FIG. 6 shows another alternative that may be used when media such as music fails to play or fails to continue to play. FIG. 6 may therefore be used as an alternative to what is shown in FIG. 4 for media of the same general type. In the FIG. 6 example, the graphic 320 on display 14 is an image of a broken guitar, and the sound 340 emitted by audio display 12 is intended to resemble the sound that a guitar might make as it is broken (indicated in FIG. 6 by the letters CRASH-TWANG). Graphic 320 includes the image of a broken guitar 322 with broken strings 324 flying. Graphic 320 may be still or moving.

It will be appreciated that FIGS. 3-6 are just some examples of the types of context-based or media-appropriate error indications that media player 10 may output when various types of media fail to play (or fail to continue to play) on the player. These output indications may range from what may be considered "serious" to what may be considered more "whimsical." These output indications may also range from having fairly accurate (i.e., true-to-life) graphic and/or acoustic content, to having content that is more abstract. The degree of graphic and/or acoustic ornamentation can vary. The time duration of the output(s) can vary. Any graphic employed can be still or moving. Contextual audible error indications that may be produced may include something like a pre-recorded synthesized voice or voices, a pre-recorded human voice or voices, pre-designed and pre-recorded sounds generally (possibly including music), beeps, etc. Some electronic devices like 10 may use light indicators (e.g., LEDs), rather than full graphic displays, for visual output, and such light indicators may also be used to produce contextual error indications in accordance with this invention.

Figure 7:
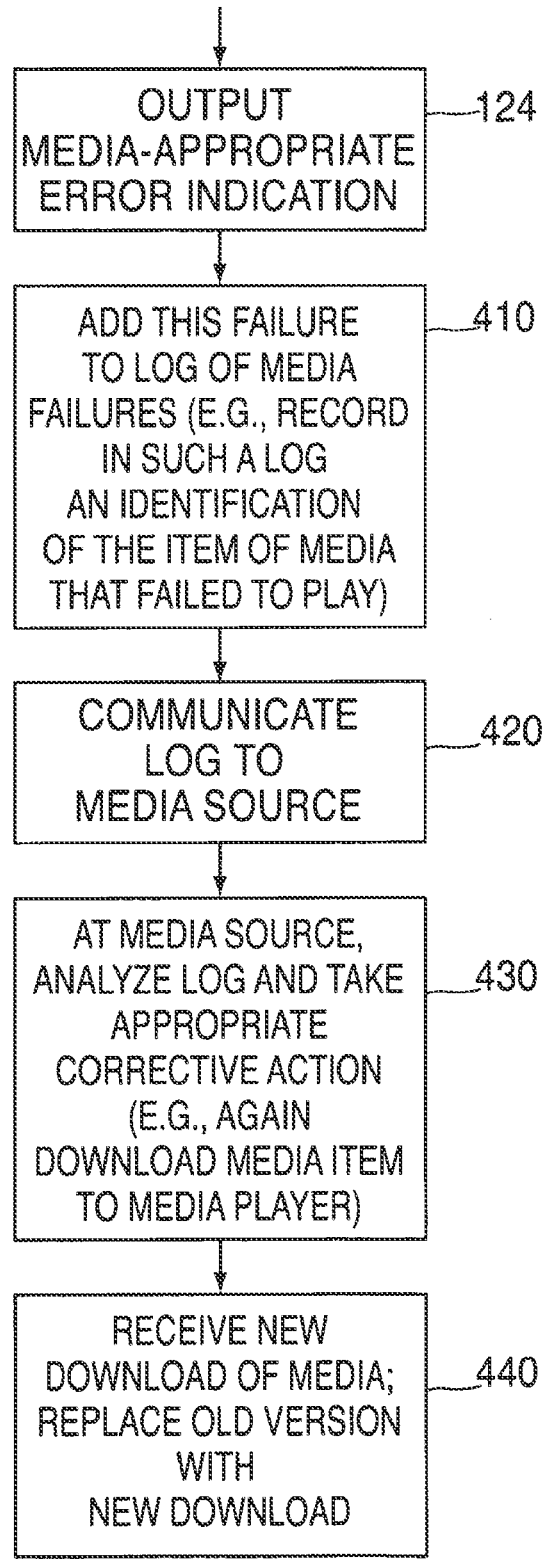
FIG. 7 is a simplified flow chart for an illustrative embodiment of certain other possible aspects of the invention.

FIG. 7 shows some optional additional steps that may be employed if desired. These steps relate to media player 10 creating and maintaining a log (e.g., in memory 16) of media playing errors or failures that have occurred, reporting those errors to other components of a larger system that supply media to player 10, and possibly benefiting from corrective action that can be taken.

Step 124 in FIG. 7 is duplicated from FIG. 2 to place the additional FIG. 7 steps in a possible context in relation to other flow aspects herein. Thus (as FIG. 7 shows) after step 124 has been performed, control may pass to step 410.

In step 410 media player 10 records information about the media-play failure that has just occurred in a log of such failure that the media player creates, maintains, and updates as needed (e.g., in its memory 16). For example, this log may include an identification of the media item that failed to play.

In step 420, media player 20 communicates the information in its log of media-play failures to other components. For example, these other external components may include other components of the larger system from which media player typically gets its media. The communication referred to in step 420 may be like any media-receiving communication that media player 20 engages in with other system components. Thus, for example, this communication may be via a cable, or it may be wireless (e.g., via WIFI, Bluetooth, etc.). The communication referred to in step 420 may occur at any convenient time. For example, it may occur as soon as a media-play failure is detected, or it may occur the next time media player 10 is connected to the other components for any purpose, such as to receive more media.

Step 430 is typically performed (at least for the most part) by system components that are external to media player 10. In this step, these components analyze the information in the play-failure log that media player 10 has supplied in order to determine and attempt appropriate corrective action. One corrective action that is very often effective is just to again download to media player 10 the media item that player 10 was previously unable to play. The illustrative embodiment shown in FIG. 7 has this being done as an example. Control then passes from step 430 to step 440.

In step 440 media player 10 receives the new download of the media that failed when previously played. Also in step 440, media player 10 replaces its old version of that media with the new download. In most cases this will enable media player 10 to play this media without failure in the future.

Figure 8:
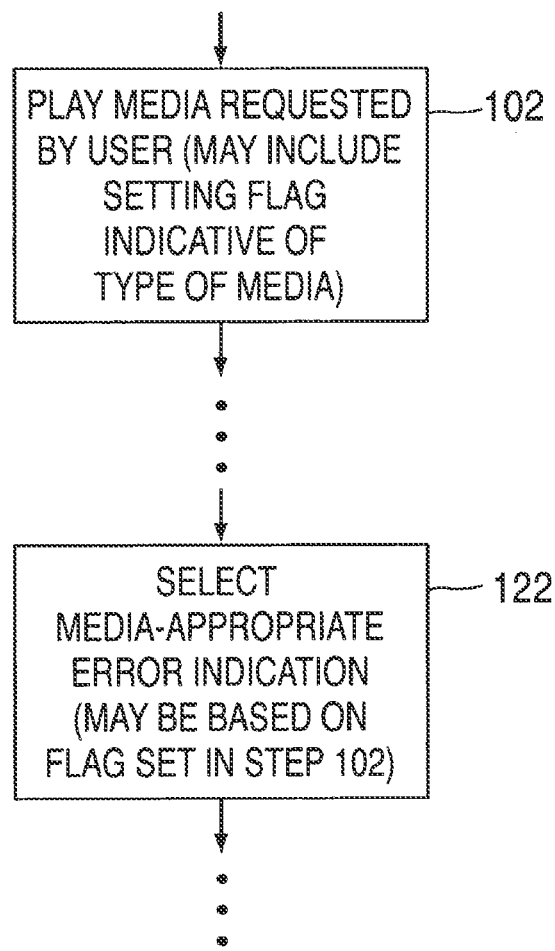
FIG. 8 is a simplified depiction of possible additional features of two of the steps in FIG. 2 in accordance with the invention.

It will be appreciated that in order for media player 10 to output media-appropriate error indication(s) per step 124, player 10 must have knowledge of the type of media that was being played when the play-failure occurred. Such knowledge is needed so that step 122 can make an appropriate error indication selection. It may be possible for step 122 to know what type of media was being played when the failure occurred from other aspects of the operation of player 10 (e.g., how control circuitry 20 is currently configured). As another example, FIG. 8 shows versions of steps 102 and 108 from FIG. 1 that can be used to facilitate this aspect of the operation. In the FIG. 8 version of step 102, a flag is set (e.g., at a particular location in memory 16) to indicate what type of media is currently being played. Then in the FIG. 8 version of step 122, this flag is used as a basis for selecting the type of error indication that is appropriate for the type of media identified by the flag.

Media player 10 can get the above-described context-based or media-appropriate error indication information in any of many different ways. For example, media player 10 can be manufactured or at least sold with a set of such error indications already installed (e.g., in memory 16). As another alternative, a set of context-based error indications can be downloaded to media player 10 at any time and in any desired way (e.g., like any download of media to the player). Such error indications can form a more or less separate data (actually media) set in memory 16. Still another possibility is for each item of media to come with its own media-appropriate error indication data (e.g., in a header to that media item), to which access can be made in steps 122 and 124 in the event that the media item fails to play. As an alternative to full error indication data as part of each media item, each media item can include a flag or other pointer information that identifies the type of error indication that should be output in the event that the media item fails to play. Such a flag or pointer can also be a header to each media item. Steps like 102 and 122 in FIG. 8 can be employed to make use of such flag or pointer information in the selection and output of media-appropriate error indications.

Figure 9:
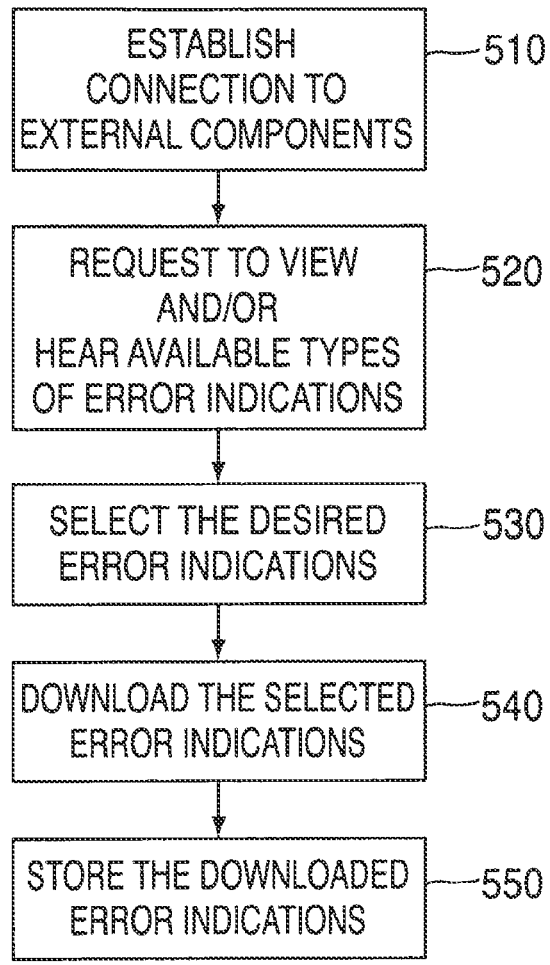
FIG. 9 is a simplified flow chart for an illustrative embodiment of still other possible aspects of the invention.

Still another possibility related to giving media player 10 media-appropriate error indications data is illustrated by FIG. 9. This FIG. shows an example of how a user of media player 10 may select error indications that the user prefers to have his or her media player employ.

In step 510 media player 10 establishes a connection to external components. This can be like any connection of media player 10 to external components for other purposes such as selecting and reviewing media that the user wants his or her media player to be able to play. Thus, as in all other previously mentioned instances, such a connection can be by cable or wireless (e.g., WIFI, Bluetooth, or the like).

In step 520 the user uses media player 10 to request to view and/or hear available types of error indications that the external components can provide to a media player. As part of step 520 the user may be able to see (via display 14) and hear (via audio output 12) various types of error indications. For example, these various types of error indications may be collected into a plurality of sets, each of which may have a different theme. A theme of one such set may be relatively "serious" and subdued, including realistic graphics for display 14 and realistic audio for audio output 12. A theme of another such set may be more "whimsical," including more abstract graphics and more fanciful audio. Still another theme for still another set of error indications may be more "outrageous," including "extreme" graphics and audio. Within each such set there will typically be one error indication that is appropriate for media like movies, one error indication that is appropriate for media like music, etc. The "granularity" of the error indications can be even greater. For example, media from actual movies may be distinguished from media from television programming, with different media-appropriate error indications being used for each (broken film graphic for movies; smashed television screen for television programming). As another example of such greater granularity, classical music media may be distinguished from country music media, with different error indications for each (broken violin graphic for classical music; broken guitar graphic for country music).

In step 530 the user uses media player 10 to select the error indications the user desires. For example, if there are various sets of different error indications grouped by theme, the user may select a particular theme and thus receive the error indications in that thematic group.

In step 540 the external components download data for the selected error indications to the user's media player 10.

In step 550, the media player stores the downloaded error indications for future use.

Figure 10:
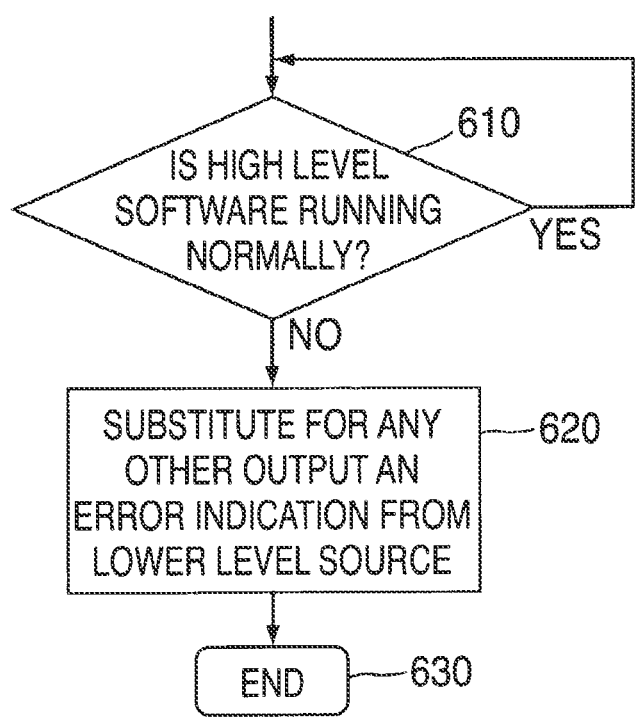
FIG. 10 is a simplified flow chart for an illustrative embodiment of yet another possible aspect of the invention.

FIG. 10 illustrates another possible aspect of the invention. This relates to the possibility that stoppage of the playing of an item of media may be due to (or may cause) stoppage of the normal higher level software of device 10. Thus, in addition to the higher level flow shown in other FIGS. herein, the flow shown in FIG. 10 may be performed in a lower level of device 10 (e.g., in firmware of the device). In step 610, this lower level flow continuously or frequently determines whether or not the higher level software (e.g., the media-playing software) of device 10 is running normally. As long as the higher level software is running properly, the FIG. 10 flow remains at step 610. However, if step 610 determines that the higher level software is not running normally, then control passes from lower level step 610 to lower level step 620.

When step 620 is performed, that step substitutes for any other output of device 10 an error indication from a lower level source, i.e., a source that is not dependent on operation of any higher level software. Again, this lower level source may be firmware of device 10. If desired, this lower-levelsourced error indication may be a media-appropriate error indication, like any of those described earlier in this specification.

After lower level step 620 has been performed, control passes from that step to lower level end step 630.

The feature illustrated by FIG. 10 ensures output of an error indication (possibly a media-appropriate error message) even if the higher level software of device 10 stops running.

It will be understood that the foregoing is only illustrative of the principles of the invention, and that various modifications can be made by those skilled in the art without departing from the scope and spirit of the invention. For example, the particular graphics shown herein for various types of media-play-failure indications are only some of the many possibilities that will occur to those skilled in the art.

The invention claimed is:

1. A media player comprising control circuitry configured to:
   allow a user of the media player to select an item of media of a particular kind for playing by the player;
   play the selected item;
   detect any failure of the media player to play the item; and
   when a failure is detected, output an error indication that is indicative of the particular kind of media.

2. The media player of claim 1, wherein the error indication includes a graphic image.

3. The media player of claim 2, wherein the graphic image includes a still image.

4. The media player of claim 2, wherein the graphic image includes a moving image.

5. The media player of claim 1, wherein the indication includes an audio output.

6. The media player of claim 1, wherein the error indication includes both an audio output and an image output.

7. The media player of claim 1, wherein the error indication includes an image of broken media of the particular kind.

8. The media player of claim 1, wherein the error indication includes an audio output having a sound associated with broken media of the particular kind.

9. The media player of claim 1, wherein the detecting includes detecting any failure of relatively high level software of the media player to continue to run, and wherein the outputting includes performing relatively low level functions, which are not dependent on the relatively high level software, to output an error indication.

10. A memory having software stored thereon, the software being executable by control circuitry in a media player to perform a method comprising:
    storing a plurality of error indications, each of which is evocative of a breakdown in playing a respective one of a plurality of kinds of media;
    allowing a user of the media player to select any one of the plurality of kinds of media and any one of a plurality of items of media of the selected kind;
    playing the selected item of media;
    detecting any failure of the media player to play the selected item;
    when a failure is detected, selecting from the plurality of error indications the one of those error indications that is evocative of a breakdown in playing media of the kind that the selected item of media is; and
    outputting the selected error indication.

11. The memory of claim 10, wherein the selected error indication includes a graphic image.

12. The memory of claim 10, wherein the selected error indication includes an audio output.

13. The memory of claim 10, wherein the selected error indication includes both an audio output and an image output.

14. The memory of claim 10, wherein the selected error indication includes an image of broken media of the kind that the selected item of media is.

15. The memory of claim 10, wherein the selected error indication includes an audio output having a sound associated with broken media of the kind that the selected item of media is.

16. The memory of claim 10, wherein the software is further executable by control circuitry in the media player to perform a method comprising:
    allowing the user to operate the media player to select any one of a plurality of error indications, wherein outputting an error indication that is indicative of the particular kind of media comprises outputting the selected error indication.

17. The memory of claim 16, wherein the software is further executable by control circuitry in the media player to perform a method comprising:
    allowing the user of the media player to connect the media player to an external source of data for the plurality of error indications; and
    downloading from the external source to the media player the selected error indication.

18. The memory of claim 10, wherein the software is further executable by control circuitry in the media player to perform a method comprising:
    allowing the user to operate the media player to select a subset of a second plurality of error indications, wherein the storing the plurality of error indications comprises storing the selected subset of the second plurality of error indications, and wherein the selecting from the plurality of error indications the one of those error indications that is evocative of a breakdown in playing media of the kind that the selected item of media is comprises selecting an error indication from the selected subset of the second plurality of error indications.

19. The memory of claim 18, wherein the software is further executable by control circuitry in the media player to perform a method comprising:
    allowing the user of the media player to connect the player to an external source of data for the second plurality of error indications; and
    downloading from the external source to the media player the selected subset of the second plurality of error indications.

20. The memory of claim 19, wherein the selected subset of the plurality of error indications comprises at least one respective error indication that is evocative of a breakdown in playing of each respective one of the plurality of kinds of media.

21. A memory having software stored thereon, the software being executable by control circuitry in a media player to perform a method comprising:
    allowing a user of the media player to select an item of media of a particular kind for playing by the player;
    playing the selected item;
    detecting any failure of the media player to play the item; and
    when a failure is detected, outputting an error indication that is indicative of the particular kind of media.

22. The memory of claim 21, wherein the error indication includes a graphic image.

23. The memory of claim 22, wherein the graphic image includes a still image.

24. The memory of claim 22, wherein the graphic image includes a moving image.

25. The memory of claim 21, wherein the indication includes an audio output.

26. The memory of claim 21, wherein the error indication includes both an audio output and an image output.

27. The memory of claim 21, wherein the error indication includes an image of broken media of the particular kind.

28. The memory of claim 21, wherein the error indication includes an audio output having a sound associated with broken media of the particular kind.

29. The memory of claim 21, wherein the detecting includes detecting any failure of relatively high level software of the media player to continue to run, and wherein the outputting includes performing relatively low level functions, which are not dependent on the relatively high level software, to output an error indication.

30. A media player comprising control circuitry configured to:
   store a plurality of error indications, each of which is evocative of a breakdown in playing a respective one of a plurality of kinds of media;
   allow a user of the media player to select any one of the plurality of kinds of media and any one of a plurality of items of media of the selected kind;
   play the selected item of media;
   detect any failure of the media player to play the selected item;
   when a failure is detected, select from the plurality of error indications the one of those error indications that is evocative of a breakdown in playing media of the kind that the selected item of media is; and
   output the selected error indication.

31. The media player of claim 30, wherein the selected error indication includes a graphic image.

32. The media player of claim 30, wherein the selected error indication includes an audio output.

33. The media player of claim 30, wherein the selected error indication includes both an audio output and an image output.

34. The media player of claim 30, wherein the selected error indication includes an image of broken media of the kind that the selected item of media is.

35. The media player of claim 30, wherein the selected error indication includes an audio output having a sound associated with broken media of the kind that the selected item of media is.

36. The media player of claim 30, wherein the control circuitry is further configured:
   allow the user to operate the media player to select any one of a plurality of error indications, wherein outputting an error indication that is indicative of the particular kind of media comprises outputting the selected error indication.

37. The media player of claim 36, wherein the control circuitry is further configured to:
   allow the user of the media player to connect the media player to an external source of data for the plurality of error indications; and
   download from the external source to the media player the selected error indication.

38. The media player of claim 30, wherein the control circuitry is further configured to:
   allow the user to operate the media player to select a subset of a second plurality of error indications, wherein the storing the plurality of error indications comprises storing the selected subset of the second plurality of error indications, and wherein the selecting from the plurality of error indications the one of those error indications that is evocative of a breakdown in playing media of the kind that the selected item of media is comprises selecting an error indication from the selected subset of the second plurality of error indications.

39. The media player of claim 38, wherein the control circuitry is further configured to:
   allow the user of the media player to connect the player to an external source of data for the second plurality of error indications; and
   download from the external source to the media player the selected subset of the second plurality of error indications.

40. The media player of claim 39, wherein the selected subset of the plurality of error indications comprises at least one respective error indication that is evocative of a breakdown in playing of each respective one of the plurality of kinds of media.

* * * * *